US012730684B2

(12) United States Patent
Derbenwick Miller et al.

(10) Patent No.: US 12,730,684 B2
(45) Date of Patent: Sep. 8, 2026

(54) MACHINE-LEARNING MODEL AND INTERFACE FOR PLANNING, PREDICTING, AND IMPLEMENTING CLOUD RESOURCE SYSTEMS

(71) Applicant: Oracle International Corporation, Redwood Shores, CA (US)

(72) Inventors: Alison J. Derbenwick Miller, Castle Pines, CO (US); Pablo Selem, Bellevue, WA (US); Sowmya Bali, Redmond, WA (US); Yang Jiao, Irvine, CA (US); Manoj Krishna Ghosh, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 502 days.

(21) Appl. No.: 18/345,694

(22) Filed: Jun. 30, 2023

(65) Prior Publication Data

US 2024/0095095 A1 Mar. 21, 2024

Related U.S. Application Data

(60) Provisional application No. 63/408,325, filed on Sep. 20, 2022.

(51) Int. Cl.

*G06F 9/455* (2018.01)
*G06F 9/50* (2006.01)
*G06F 11/34* (2006.01)

(52) U.S. Cl.

CPC .......... *G06F 9/5077* (2013.01); *G06F 9/5072* (2013.01); *G06F 11/3428* (2013.01)

(58) Field of Classification Search

CPC .................................................... G06F 9/5077

(Continued)

(56) References Cited

U.S. PATENT DOCUMENTS 7,584,239 B1 * 9/2009 Yan ......................... H04L 69/18 709/212
9,503,345 B2 * 11/2016 Caminiti ............. H04L 43/0876

(Continued)

FOREIGN PATENT DOCUMENTS

CN 112764909 A 5/2021

OTHER PUBLICATIONS

"Amazon EC2 C5 Instances", Retrieved from https://aws.amazon.com/ec2/instance-types/c5/, Retrieved on Mar. 16, 2023, p. 1.

(Continued)

*Primary Examiner* — Mehran Kamran
(74) *Attorney, Agent, or Firm* — Invoke

(57) ABSTRACT

Techniques for presenting a graphical user interface (GUI) for configuring a cloud service workstation are disclosed. The system presents a GUI that presents a plurality of possible workstation configurations and the costs associated with each respective workstation configuration, prior to creation of a workstation. The GUI updates the cost associated with a workstation configuration responsive to receiving a selection to modify the workstation configuration from a user. The user may request a different configuration based on a single user input, without specifying which resources to modify. The GUI may recommend a workstation configuration based on one or more user inputs such as a budget, an application service domain, a duration, or a processing power requirement.

21 Claims, 9 Drawing Sheets

(58) Field of Classification Search
USPC .............................................................. 718/1
See application file for complete search history.

(56) References Cited

U.S. PATENT DOCUMENTS

| | | | | |
|---|---|---|---|---|
| 9,639,446 | B2 * | 5/2017 | Wright | G06F 11/3476 |
| 10,409,629 | B1 * | 9/2019 | Natanzon | G06F 9/45558 |
| 10,713,072 | B1 * | 7/2020 | Burgin | G06F 9/45558 |
| 11,777,814 | B1 * | 10/2023 | Britt | H04L 43/0817 709/224 |
| 11,886,926 | B1 * | 1/2024 | Gadalin | G06F 9/4856 |
| 2011/0313902 | A1 * | 12/2011 | Liu | G06Q 30/04 705/34 |
| 2012/0017157 | A1 * | 1/2012 | Bush | G06Q 10/06 715/810 |
| 2015/0032817 | A1 * | 1/2015 | Garg | G06F 11/2048 709/204 |
| 2016/0381128 | A1 * | 12/2016 | Pai | G06F 9/46 709/203 |
| 2017/0109187 | A1 * | 4/2017 | Cropper | G06F 1/3234 |
| 2018/0336619 | A1 * | 11/2018 | Bhandari | G06Q 30/0631 |
| 2020/0310852 | A1 * | 10/2020 | Featonby | G06F 9/5077 |
| 2020/0334059 | A1 * | 10/2020 | Ramamoorthi | G06F 9/45558 |
| 2021/0103870 | A1 * | 4/2021 | Hayashi | G06F 9/5072 |
| 2021/0176266 | A1 * | 6/2021 | Ramamurthy | G06F 9/5077 |
| 2022/0261268 | A1 * | 8/2022 | Kodama | G06F 9/45558 |
| 2023/0401103 | A1 * | 12/2023 | Ram | G06F 11/3433 |
| 2024/0095095 | A1 * | 3/2024 | Derbenwick Miller | G06F 9/5072 |

OTHER PUBLICATIONS

"Amazon EC2 Cost and Capacity Optimization", Retrieved from https://aws.amazon.com/ec2/cost-and-capacity/, Retrieved on Mar. 16, 2023, pp. 2.
"Amazon EC2 instances", Retrieved from https://docs.aws.amazon.com/AWSEC2/latest/UserGuide/Instances.html, Retrieved on Mar. 16, 2023, p. 1.
"AWS Compute Optimizer", Retrieved from https://aws.amazon.com/compute-optimizer/, Retrieved on Mar. 16, 2023, pp. 2.
"Azure Virtual Desktop", Retrieved from https://azure.microsoft.com/en-us/products/virtualdesktop, Retrieved on Mar. 16, 2023, pp. 1-13.
"Cloud PC size recommendations", Retrieved from , https://learn.microsoft.com/en-us/windows-365/enterprise/cloud-pc-size-recommendations, Mar. 24, 2023, pp. 2.
"Cloud Workstations architecture", Retrieved from https://cloud.google.com/workstations/docs/architecture, Mar. 13, 2023, pp. 3.
"Cloud Workstations documentation", Retrieved from https://cloud.google.com/workstations/docs, Retrieved on Mar. 16, 2023, p. 1.
"Cloud Workstations overview", Retrieved from https://cloud.google.com/workstations/docs/overview, Mar. 13, 2023, pp. 4.
"Compute optimized instances", Retrieved from https://docs.aws.amazon.com/AWSEC2/latest/UserGuide/compute-optimized-instances.html, Retrieved on Mar. 16, 2023, p. 1.
"Create a workstation", Retrieved from https://cloud.google.com/workstations/docs/createworkstation, Mar. 13, 2023, pp. 6.
"Customize workstation configurations", Retrieved from https://cloud.google.com/workstations/docs/customize-workstation-configurations, Mar. 16, 2023, p. 1.
"Navigating Frame", Retrieved from https://docs.frame.nutanix.com/getting-started/userexperience/ account-nav/, Retrieved on Mar. 16, 2023, pp. 24.
"Nutanix Frame Platform Documentation", Retrieved from https://docs.frame.nutanix.com/, Retrieved on Mar. 16, 2023, p. 1.
"NVIDIA RTX Virtual Workstation the World's Most Powerful Virtual Workstation", Sep. 2021, pp. 5.
"NVIDIA RTX Virtual Workstation", Retrieved from https://www.nvidia.com/en-us/designvisualization/, Retrieved on Mar. 16, 2023, pp. 3.
"Resize a Cloud PC (preview)", Retrieved from https://leam.microsoft.com/en-us/windows-365/enterprise/resize-cloud-pc, Mar. 2, 2023, pp. 1-3.
"The GPU cloud built for Machine Learning", Retrieved from https://www.paperspace.com/gpu-cloud, Retrieved on Mar. 16, 2023, pp. 6.
"What is Amazon EC2", Retrieved from https://docs.aws.amazon.com/AWSEC2/latest/UserGuide/concepts.html, Retrieved on Mar. 16, 2023, p. 1.
"Windows 365 Cloud PC", Retrieved from https://emerge.digital/cloud-services/windows-365-cloud-pc/, Retrieved on Mar. 16, 2023, pp. 1-5.
An B. et al., "Workspace as a Service: an Online Working Environment for Private Cloud", IEEE Symposium on Service-Oriented System Engineering, 2017, pp. 19-27.
Poccia D., "New for AWS Compute Optimizer—Enhanced Infrastructure Metrics to Extend the Look-Back Period to Three Months", Nov. 29, 2021, pp. 3.

* cited by examiner

DISPLAY
912
INPUT
DEVICE
914
CURSOR
CONTROL
916
MAIN
MEMORY
906
ROM
908
STORAGE
DEVICE
910
BUS
902
PROCESSOR
904
COMMUNICATION
INTERFACE
918
900
NETWORK
LINK
920
928
INTERNET
ISP
926
SERVER
930
LOCAL
NETWORK
922
HOST
924

MACHINE-LEARNING MODEL AND INTERFACE FOR PLANNING, PREDICTING, AND IMPLEMENTING CLOUD RESOURCE SYSTEMS

INCORPORATION BY REFERENCE; DISCLAIMER

The following application is hereby incorporated by reference: application no. 63/408,325, filed Sep. 20, 2022. The applicant hereby rescinds any disclaimer of claims scope in the parent application(s) or the prosecution history thereof and advise the USPTO that the claims in the application may be broader than any claim in the parent application(s).

TECHNICAL FIELD

The present disclosure relates to a graphical user interface for creating a cloud service infrastructure. In particular, the present disclosure relates to presenting cloud workstation configurations and associated costs, automatically updating the associated costs according to user input, and providing recommended workstation configurations.

BACKGROUND

Cloud-based services provide a convenient, cost-effective, and secure way for a customer to configure and use computational resources without having to invest in and manage hardware and software within the customer organization. However, it can be difficult for the customer to know how their selected components for a cloud workstation configuration will affect the total cost of operating the configuration. It can also be difficult for the customer to select a configuration that aligns with their particular computational needs and with their budget.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
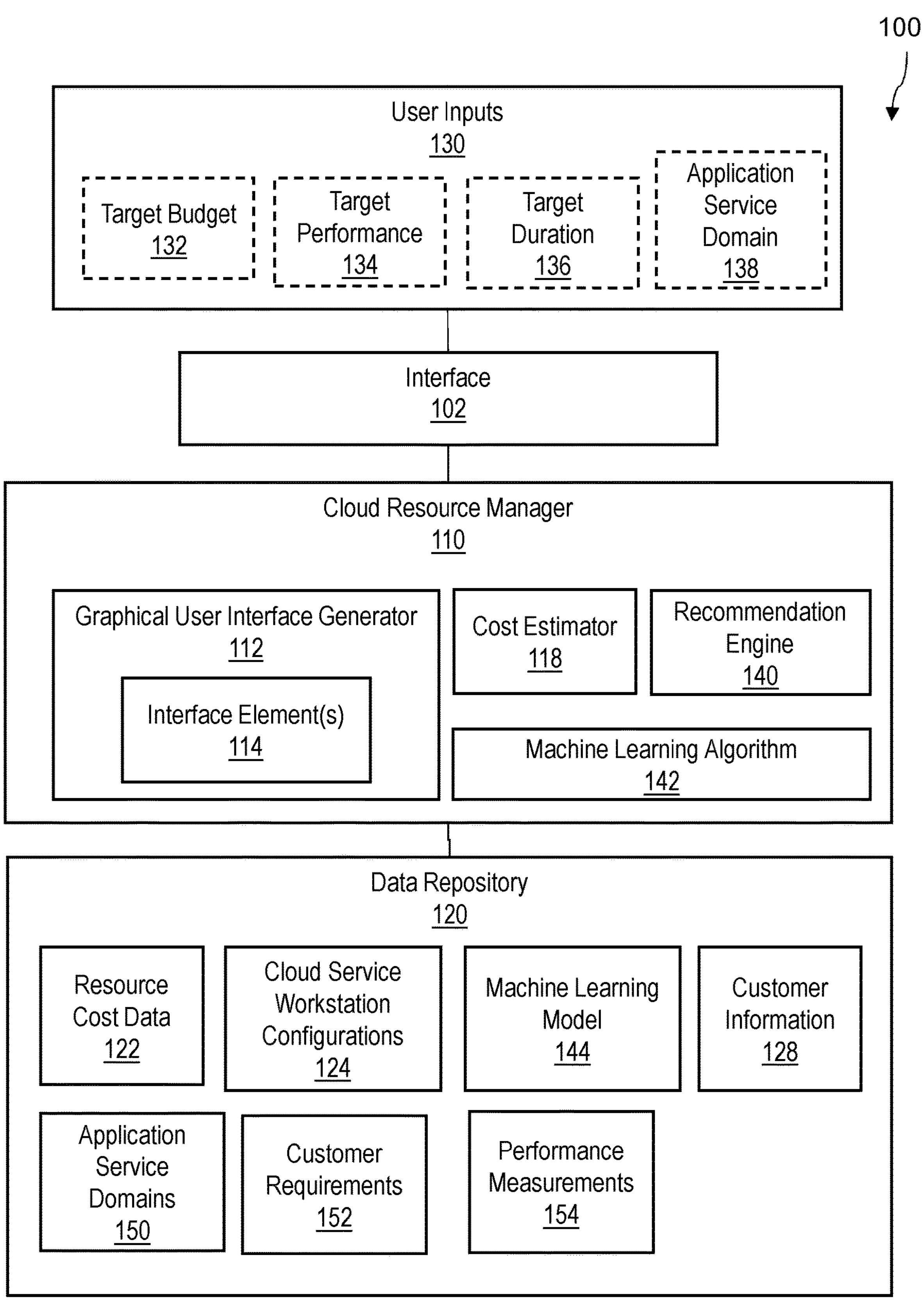
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GRAPHICAL USER INTERFACE
4. INTERACTIVE CLOUD WORKSTATION CREATION
5. EXAMPLE EMBODIMENTS
6. PRACTICAL APPLICATIONS, ADVANTAGES, AND IMPROVEMENTS
7. COMPUTER NETWORKS AND CLOUD NETWORKS
8. HARDWARE OVERVIEW
9. MISCELLANEOUS; EXTENSIONS

1. GENERAL OVERVIEW

One or more embodiments display a graphical user interface that presents various cloud service workstation configurations, each cloud service workstation configuration including a combination of compute resources, network resources, and storage resources. The graphical user interface further presents the costs associated with each respective cloud service workstation configuration, prior to creation of the corresponding cloud service workstations. The graphical user interface accepts user input selecting one of the various cloud service workstation configurations.

The system may relocate icons or other interface elements on the graphical user interface based on the user input selecting one of the various cloud service workstation configurations. In an example, the system may display the selected cloud service workstation at a focal point (e.g., center) of the graphical user interface. The system may further rearrange other candidate cloud service workstations around the selected cloud service workstation based on a cartesian distance between a n-dimensional vector representing the selected cloud service workstation and n-dimensional vectors representing other candidate cloud service workstations. The interface elements for the other cloud service workstations associated with the smallest cartesian distance are presented closest to the interface element representing the selected cloud service workstation. This practical application presents a specific improvement over prior systems, results in an improved graphical user interface.

One or more embodiments display a graphical user interface that present interface elements for modifying a candidate cloud service workstation configuration. The system initially presents the candidate cloud service workstation configuration concurrently with interface elements that accept user input for modifying parameters that are external to the cloud service workstation configuration. As referred to herein, the "external parameters" include parameters that do not themselves specify or select components of a cloud service workstation. Rather, the external parameters serve as input for a system to select the actual components of the cloud service workstation. Specifically, the system may apply a set of rules to the external parameters, received via user input, to build or select a cloud service workstation configuration. Examples of external parameters include but are not limited to a budget for the cloud service workstation, an intended application service domain for the cloud service workstation, and an intended duration of time for operating the cloud service workstation. The system selects the actual components of the cloud service workstation to generate an alternate cloud service workstation that differs from the initially presented cloud service workstation. In another example, the system may select a best match from a pre-configured candidate set of cloud service workstations based on the selected parameters. The system then presents the attributes of the system-selected or system-generated cloud service workstation configuration.

Advantageously, the system provides an improvement in cloud configuration technology. Conventional systems may require a technical user with a deep understanding of cloud resources for configuring a cloud service workstation. Embodiments herein allow a non-technical user to configure a cloud service workstation by submission of parameters that are external to the cloud service workstation configuration. The system performs the technical operations for selecting cloud service workstation components that are determined to be well suited based on the selected external parameters.

One or more embodiments implement a machine learning model for selecting cloud service workstation configurations. The system initially trains a machine learning model based on historical training data. The historical training data includes a training data set comprising a cloud service workstation configuration, an application service domain, and a performance measurement corresponding to performance of the cloud service workstation configuration in the application service domain. The system then applies the trained machine learning model to a target dataset. The target dataset may include a target application service domain and/or a performance criterion. Applying the machine learning model to the target dataset results in computing a cloud service workstation configuration. The system may receive feedback from a user with regard to the cloud service workstation configuration computed for the user. As an example, the feedback may be positive, indicating that the system-computed cloud service workstation configuration is suitable for the target application service domain and/or the performance criteria. In another example, the feedback may be negative, indicating that the system-computed cloud service workstation configuration is not suitable for the target application service domain and/or the performance criteria. The system retrains or updates the machine learning model based on the feedback.

One or more embodiments described in this Specification and/or recited in the claims may not be included in this General Overview section.

2. SYSTEM ARCHITECTURE

FIG. 1 illustrates a system 100 in accordance with one or more embodiments. As illustrated in FIG. 1, system 100 includes an interface 102, a cloud resource manager 110, and a data repository 120. The system 100 may respond to one or more user inputs 130. In one or more embodiments, the cloud resource manager 110 may include one or more functional components such as a graphical user interface generator 112, a cost estimator 118, a recommendation engine 140, and a machine learning algorithm 142.

In one or more embodiments, the cloud resource manager 110 refers to hardware and/or software configured to perform operations described herein for presenting a graphical user interface configured to present options for workstation configurations and their associated costs, and to update the costs as the user modifies selections. Examples of operations for presenting the graphical user interface are described below with reference to FIG. 3.

The graphical user interface generator 112 may generate and/or select interface elements 114 and present them on the interface 102. The interface elements 114 may include one or more elements that represent workstation configurations. The interface elements 114 may include an element that represents a cost associated with a workstation configuration. The interface elements 114 may include an element that indicates that another interface element has been selected. The interface elements 114 may include an element that presents information about a relationship between a cost of a selected workstation configuration and a target budget 132. The interface elements 114 may include an element that, when selected with a single user input, causes the recommendation engine 140 to recommend a workstation configuration to the user, via another interface element.

A cloud service workstation configuration 124 may define a set of one or more resources, including one or more types of resources that will be used by a workstation having that configuration when operational. Resources may include compute resources, network resources, and storage resources. A cloud workstation configuration 124 may include metadata tags, labels, or other identifiers that indicate specific application service domains for which the workstation configuration may be used. The cost estimator 118 may determine a cost associated with a workstation configuration 124, for example, by accessing resource cost data 122 for each resource included in a workstation configuration 124, and resource cost data 122 for any additional components selected by the user for use with a selected workstation configuration. The cost estimator 118 may also access and apply customer information 128, which may include any negotiated costs for a particular customer that differ from the resource cost data.

The user may optionally provide one or more external parameters as user inputs 130 to the system 100. For example, a user may provide a target budget 132 as a user input. The target budget 132 may specify an amount of money that a user is willing to spend per month for the use of a workstation or a total amount of money that the user is willing to spend for the entire duration of a workstation. The user may provide a target performance 134 as a user input. The target performance 134 may specify one or more performance parameters that the user wants for their workstation, such as processing speed, number of operations per second, and/or throughput. The user may provide a target duration 136 as a user input. The target duration 136 may specify an amount of time that the workstation will be used. Target budget 132, target performance 134 and target duration 136 may affect what workstation configurations are available that meet the user's specifications. For example, a high-performance workstation may reduce the duration of processing tasks performed by a workstation but may increase the cost. In another example, a lower cost workstation configuration may increase the duration needed to complete processing tasks.

The user may provide an application service domain 138 as a user input. An application service domain 138 may define a collection of resources, software, and other specific configurations for a type of application. For example, application service domains may exist for a life sciences application, a biology application, a geospatial application, and/or a machine learning/artificial intelligence application.

The recommendation engine 140 may receive the one or more user inputs 130 and may recommend a particular workstation configuration for the user based on the user inputs. For example, if provided a target budget 132, the recommendation engine 140 may search the cloud service workstation configurations 124 and may present any workstation configurations associated with a cost that is at or below the target budget. In another example, if provided an application service domain 138, the recommendation engine may use a machine learning model 144 to recommend a particular workstation configuration based on the application service domain 138 and any other provided user inputs.

The recommendation engine 140 may apply one or more rules to the one or more user inputs 130 to recommend a workstation configuration. A rule may cause the recommendation engine 140 to select one or more specific resources or types of resource based on a user input. For example, a rule may specify that if a target budget is below a threshold amount, the recommendation engine 140 should select a compute resource with a cost below another threshold amount. A rule may cause the recommendation engine 140 not to select a particular resource or type of resource. For example, a rule may specify that if a high-performance input is specified, the recommendation engine 140 should not select any compute resource with a speed of less than a threshold, or that a particular storage resource should not be used in the same configuration as a particular compute resource.

In one or more embodiments, a machine learning algorithm 142 is an algorithm that can be iterated to learn a target model that best maps a set of input variables to an output variable, using a set of training data. In particular, the machine learning algorithm 142 is configured to generate and/or train the machine learning model 144.

The training data includes datasets and associated labels. The datasets are associated with input variables for the target model 144. The datasets may include, for example, one or more cloud service workstation configurations 124. The datasets may include one or more application service domains 150 available at the cloud service provider. The datasets may include customer requirements 152 such as security requirements and/or compliance requirements for a particular customer. The associated labels are associated with the output variable of the target model 144, e.g., a particular workstation configuration. The training data may be updated based on, for example, feedback on the accuracy of the current target model 144. Feedback may include performance measurements 154 or customer feedback, e.g., from surveys. Updated training data is fed back into the machine learning algorithm, which in turn updates the target model 144.

The machine learning algorithm 142 generates the target model 144 such that the target model 144 best fits the datasets of training data to the labels of the training data. Additionally, or alternatively, the machine learning algorithm 142 generates the target model 144 such that when the target model 144 is applied to the datasets of the training data, a maximum number of results determined by the target model 144 matches the labels of the training data. Different target models may be generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or executed on the same computing system as the cloud resource manager 110. Alternatively, or additionally, a data repository 120 may be implemented or executed on a computing system separate from the cloud resource manager 110. The data repository 120 may be communicatively coupled to the cloud resource manager 110 via a direct connection or via a network.

Information describing resource cost data 122, cloud service workstation configurations 124, machine learning model 144, customer information 128, application service domains 150, customer requirements 152, and performance measurements 154 may be implemented across any of components within the system 100. However, this information is illustrated within the data repository 120 for purposes of clarity and explanation.

In an embodiment, the cloud resource manager 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, interface 102 refers to hardware and/or software configured to facilitate communications between a user and the cloud resource manager 110. Interface 102 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 102 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 102 is specified in one or more other languages, such as Java, C, or C++.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 7, titled "Computer Networks and Cloud Networks."

3. GRAPHICAL USER INTERFACE

Figure 2:
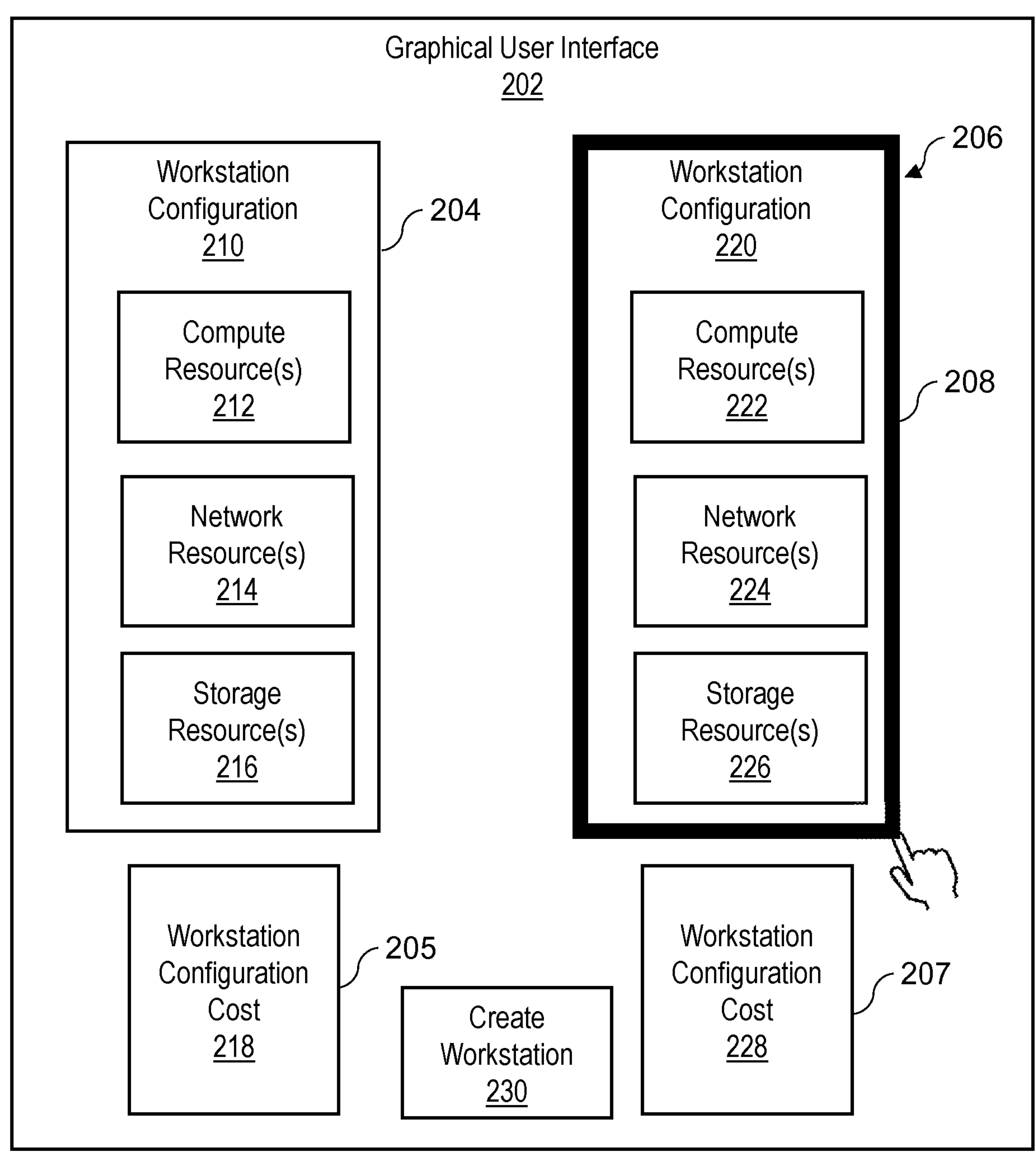
FIG. 2 illustrates an example of a graphical user interface in accordance with one or more embodiments.

FIG. 2 illustrates an example of a graphical user interface 202 as may be generated by the graphical user interface generator 112. The graphical user interface 202 may be presented via interface 102. As shown, the graphical user interface 202 is presenting four interface elements: a workstation configuration element 204, a workstation configuration cost element 205, a workstation configuration element 206, a workstation configuration cost element 207.

The workstation configuration element 204 represents and presents a cloud service workstation configuration 210. The workstation configuration 210 comprises a set of resources that behave functionally as an individual computer. Workstation configuration 210 may include one or more compute resources 212. A compute resource 212 includes one or more processing components, memory, and any other processing resources provided by the cloud service to the user of the cloud workstation 212. The compute resources 212 may be reserved exclusively within the cloud service for the instance of the cloud workstation.

Workstation configuration 210 may include one or more network resources 214. The network resources 214 may include one or more communication channels and network software and hardware that the workstation configuration 210 may use to send or receive data from other cloud workstations, other cloud infrastructures, or other networks.

Workstation configuration 210 may include one or more storage resources 216. A storage resource 216 may include a dedicated amount of storage on a computer readable medium, for example, a 500 GB portion of a solid-state drive within the cloud service. Data used and generated by the compute resource(s) 212 may be stored in the storage resource 216. A storage resource 216 may reside on a computer readable medium shared by other cloud workstations and/or other cloud infrastructures. A storage resource 216 may be associated with a cost tier. Some storage resources may have a higher cost of use while providing advantages such as speed of access, security, frequent backups, or other benefits, while other storage resources may be associated with a second, lower cost tier and may provide fewer or lesser benefits compared to storage resources in a higher cost tier. The workstation configuration cost element 205 represents a workstation configuration cost 218 associated with the workstation configuration 210.

The workstation configuration element 206 represents and presents a cloud service workstation configuration 220. The workstation configuration 220 comprises a different set of resources than those of workstation configuration 210, for example, compute resources 222, network resources 224 and storage resources 226. The workstation configuration cost element 207 represents a workstation configuration cost 228 associated with the workstation configuration 220.

The graphical user interface 202 also presents an interface element 208 that indicates that the interface element 206, and the workstation configuration 220 that interface element 206 represents, has been selected. Interface element 208 is shown as a thicker border line, however, any graphical indication of selection can be used, e.g., a different shading pattern or color, or a check box.

The graphical user interface 202 also presents an interface element 230 that allows the user to accept and create the selected workstation configuration. When a user selects the interface element 230, the cloud resource manager 110 may create a workstation according to the resources defined in the selected workstation configuration.

4. INTERACTIVE CLOUD WORKSTATION CREATION

Figure 3:
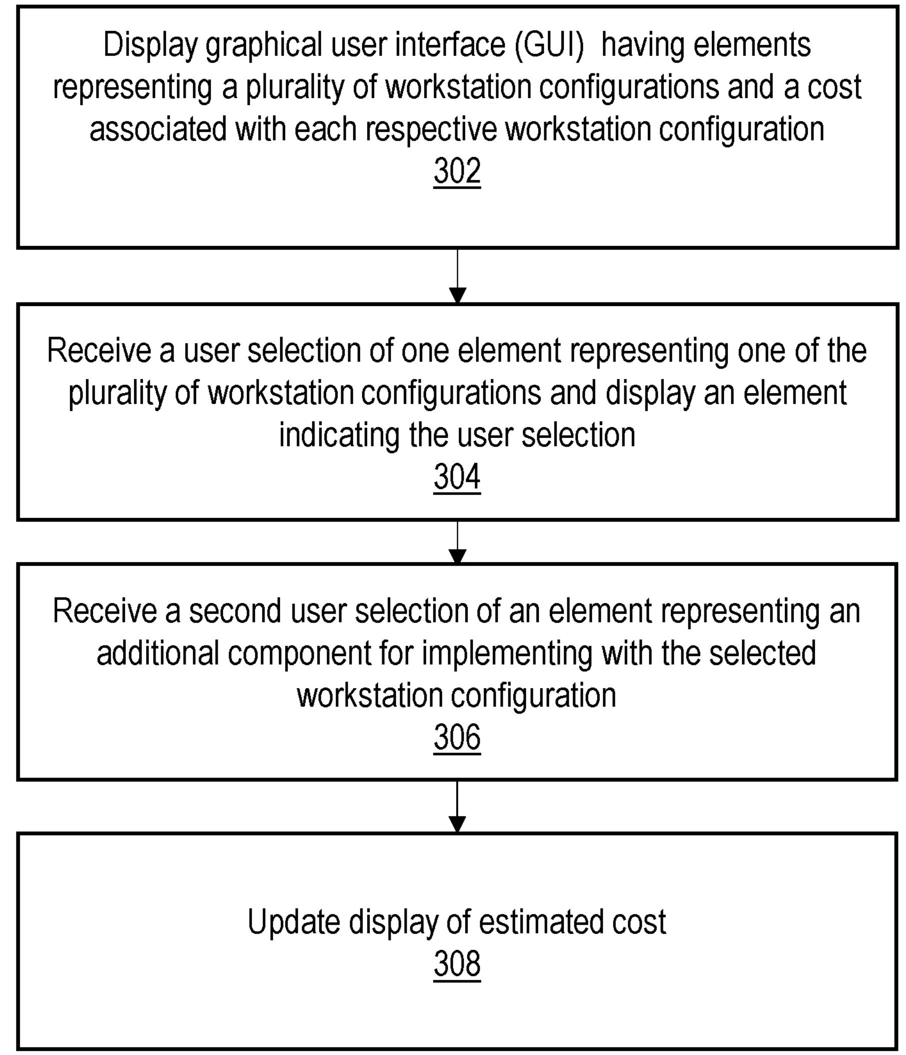
FIG. 3 illustrates an example set of operations for presenting a graphical user interface for configuring a cloud service workstation in accordance with one or more embodiments.

FIG. 3 illustrates an example set of operations for presenting a graphical user interface for selecting a workstation configuration in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments. An example of the result of the operations illustrated in FIG. 3 is shown and described with respect to FIG. 5 below.

In one or more embodiments, the graphical user interface generator 112 displays a graphical user interface (GUI) having interface elements representing a plurality of workstation configurations and a cost associated with each respective workstation configuration (Operation 302). In the absence of any user inputs, the graphical user interface generator 112 may select a plurality of workstation configurations to present that include a low-cost workstation configuration, a mid-cost workstation configuration, and a high-cost workstation configuration. In some embodiments, the graphical user interface generator 112 may select a default set of workstation configurations to present.

When one or more user inputs 130 are provided, the graphical user interface generator 112 may select workstation configurations that meet the requirements specified by the user input. In some embodiments, the graphical user interface generator 112 may request a recommended workstation configuration from the recommendation engine 140.

In one or more embodiments, the graphical user interface generator 112 receives a user selection of one element representing one of the plurality of workstation configurations and display an element indicating the user selection (Operation 304). The user may use a pointing device, keyboard, or touch on a touch-sensitive screen via the interface 102 to select one of the presented plurality of workstation configurations. The graphical user interface generator 112 may present an interface element that indicates which workstation configuration was selected.

In one or more embodiments, the graphical user interface generator 112 receives a second user selection of an element representing an additional component for implementing with the selected workstation configuration (Operation 306). In addition to presenting interface elements representing the plurality of workstation configurations, or upon selection of one of the workstation configurations, the graphical user interface generator 112 may present interface elements that represent additional, optional, components that the user can add to the selected workstation configurations. The additional components may include, for example, additional storage resources, software applications for the workstation to execute, or other resources. The user may select an additional component with, for example, a pointing device, or a keyboard selection.

In one or more embodiments, the graphical user interface generator 112 updates a display of an estimated cost (Operation 308). The graphical user interface generator 112 may provide an identifier for the selected additional component to the cost estimator 118. The cost estimator 118 may retrieve cost information from resource cost data 122 and any negotiated cost information from customer information 128 and may determine an updated cost from the cost associated with the selected workstation configuration and the retrieved cost information. The graphical user interface generator 112 may then update the display of the associated cost for the selected workstation with the updated cost from the cost estimator 118.

At any point during the display and update of the graphical user interface, the system may relocate icons or other interface elements on the graphical user interface based on the user input selecting one of the various cloud service workstation configurations. In an example, the system may display the selected cloud service workstation at a focal point (e.g., center) of the graphical user interface. The system may further rearrange other candidate cloud service workstations around the selected cloud service workstation based on a cartesian distance between a n-dimensional vector representing the selected cloud service workstation and n-dimensional vectors representing other candidate cloud service workstations. The interface elements for the other cloud service workstations associated with the smallest cartesian distance are presented closest to the interface element representing the selected cloud service workstation. The system may further change transparency, brightness, or other visual characteristics of the interface elements, for example to highlight a selected element or to obscure an unselected element.

Figure 4:
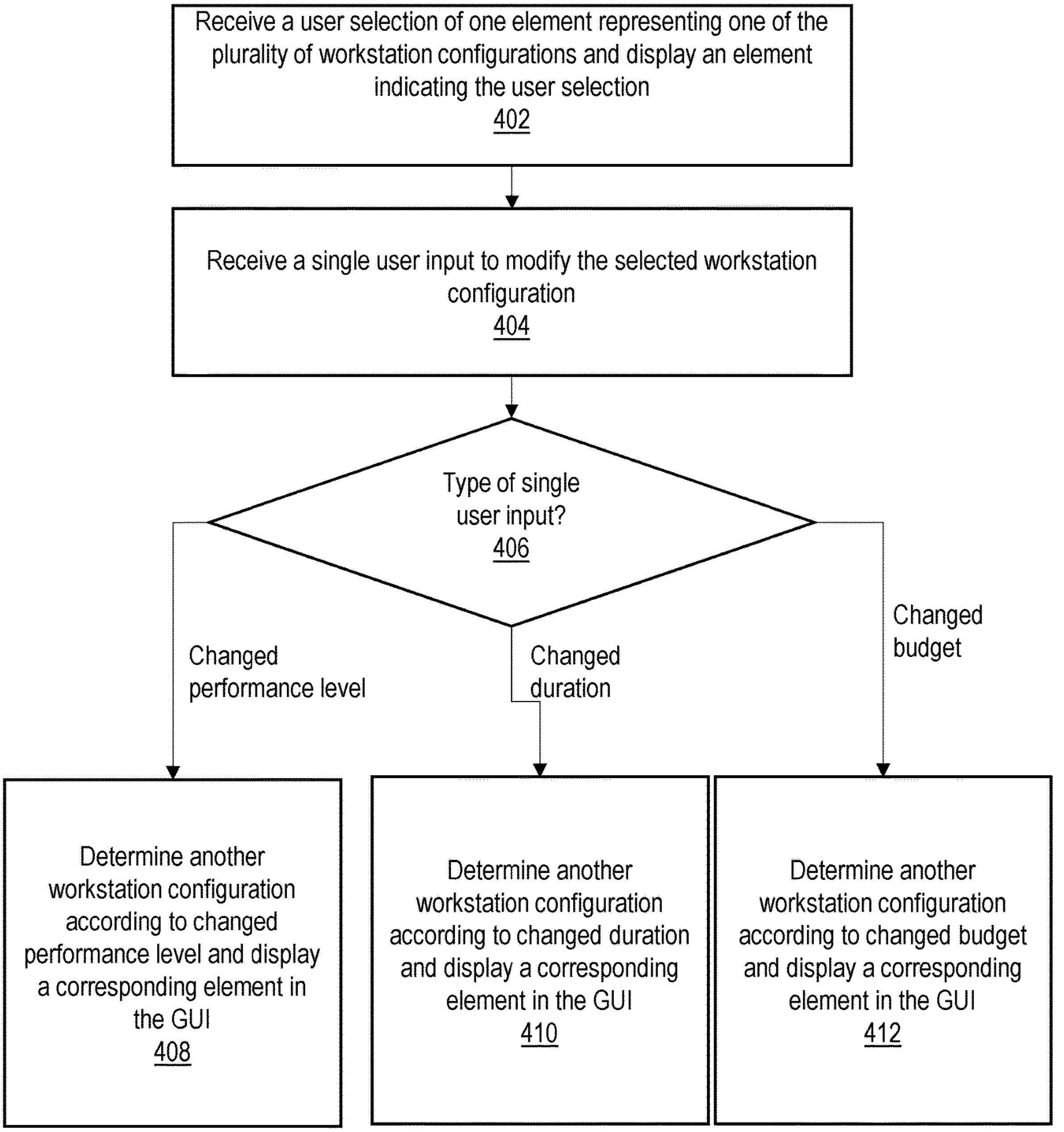
FIG. 4 illustrates an example set of operations for presenting a graphical user interface for modifying a cloud service workstation in accordance with one or more embodiments.

FIG. 4 illustrates an example set of operations for presenting a graphical user interface for selecting a workstation configuration in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments. An example of the result of the operations illustrated in FIG. 4 is shown and described with respect to FIG. 6 below.

In one or more embodiments, the graphical user interface generator 112 may receive a user selection of one interface element representing one of the plurality of workstation configurations and display another interface element indicating the user selection (Operation 402). The user may use a pointing device, keyboard, or touch on a touch-sensitive screen via the interface 102 to select one of the presented plurality of workstation configurations. The graphical user interface generator 112 presents an interface element that indicates which workstation configuration was selected such as a larger border, a change in color, a change in shading, a checked box, or any other graphical indication of the selection.

In one or more embodiments, the graphical user interface generator 112 may receive a single user input to modify the selected workstation configuration (Operation 404). The graphical user interface generator 112 may provide an interface element that allows the user to modify the selected workstation configuration with a single input. The single user input may be one of the user inputs 130. The single user input allows the user to modify their selected workstation configuration without having to select specific components and/or resources to change within their selected workstation configuration.

In one or more embodiments, the graphical user interface generator 112 may determine what type of single user input was received (Operation 406). The single user input may be a newly specified or modified target budget 132. The single user input may be a newly specified or modified target performance 134. The single user input may be a newly specified or modified target duration 136.

In one or more embodiments, when the single user input is to change the performance level, the graphical user interface generator 112 may determine another workstation configuration or a change to one or more resources in the currently selected workstation configuration that satisfies the performance level input (Operation 408). For example, the graphical user interface generator 112 may request a higher performance workstation configuration from the recommendation engine 140, which may then add additional compute resources or may swap in a more powerful compute resource. The cost estimator 118 may also update the cost associated with the modified workstation configuration. The graphical user interface generator 112 may then present the modified workstation configuration and the updated cost.

In one or more embodiments, when the single user input is to change the duration, the graphical user interface generator 112 may determine another workstation configuration or a change to one or more resources in the currently selected workstation configuration that satisfies the duration input (Operation 410). For example, the graphical user interface generator 112 may request a workstation configuration that can operate for longer within the constraints of a currently specified budget from the recommendation engine 140, which may then swap in one or more less expensive resources. The cost estimator 118 may also update the cost associated with the modified workstation configuration. The graphical user interface generator 112 may then present the modified workstation configuration and the updated cost.

In one or more embodiments, when the single user input is to change the budget, the graphical user interface generator 112 may determine another workstation configuration or a change to one or more resources in the currently selected workstation configuration that satisfies the budget input (Operation 412). For example, if the single user input increases an available budget, the graphical user interface generator 112 may request a workstation configuration that costs more from the recommendation engine 140, which may then add additional resources or may swap in a more expensive resource. The cost estimator 118 may also update the cost associated with the modified workstation configuration. The graphical user interface generator 112 may then present the modified workstation configuration and the updated cost.

5. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5:
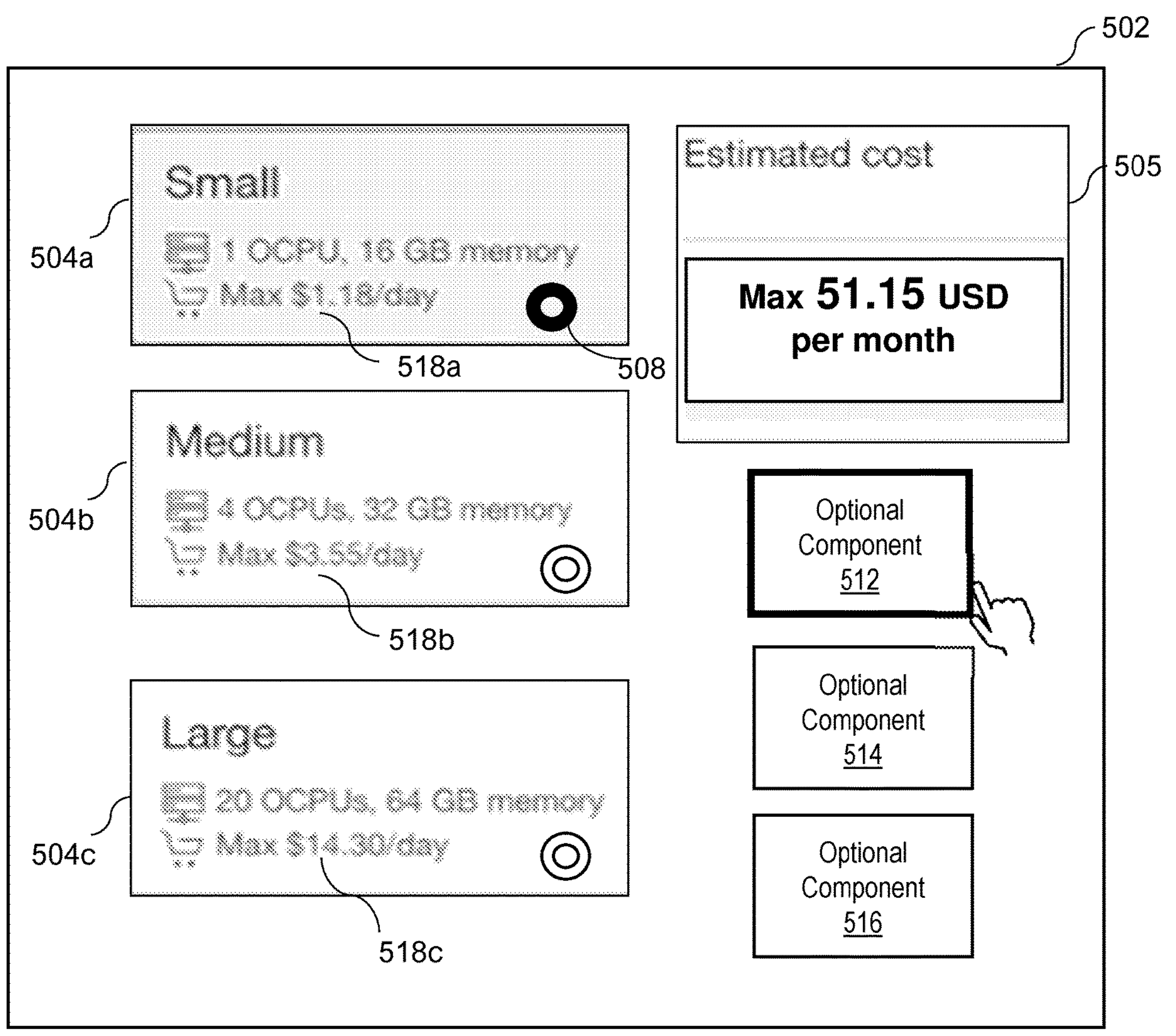
FIG. 5 illustrates an example of a graphical user interface in accordance with one or more embodiments.

FIG. 5 illustrates an example of a GUI 502 that is presenting three interface elements 504 *a*, 504 *b*, and 504 *c* representing three different workstation configurations. The GUI 502 is also presenting three interface elements 518*a*, 518*b*, and 518*c* that present a cost associated with the respective workstation configurations. The GUI 502 is also presenting three interface elements representing three respective optional components 512, 514, and 516. Interface element 508 indicates that the user has selected interface element 504 *a*, corresponding to the "small" workstation configuration, which has a workstation configuration cost of $1.18 per day. The user has also selected optional component 512, which has an associated cost of $0.47 per day. The cost associated with the selected workstation configuration and the optional component 512 is combined and displayed in the interface element 505 as $51.15 per month.

Figure 6:
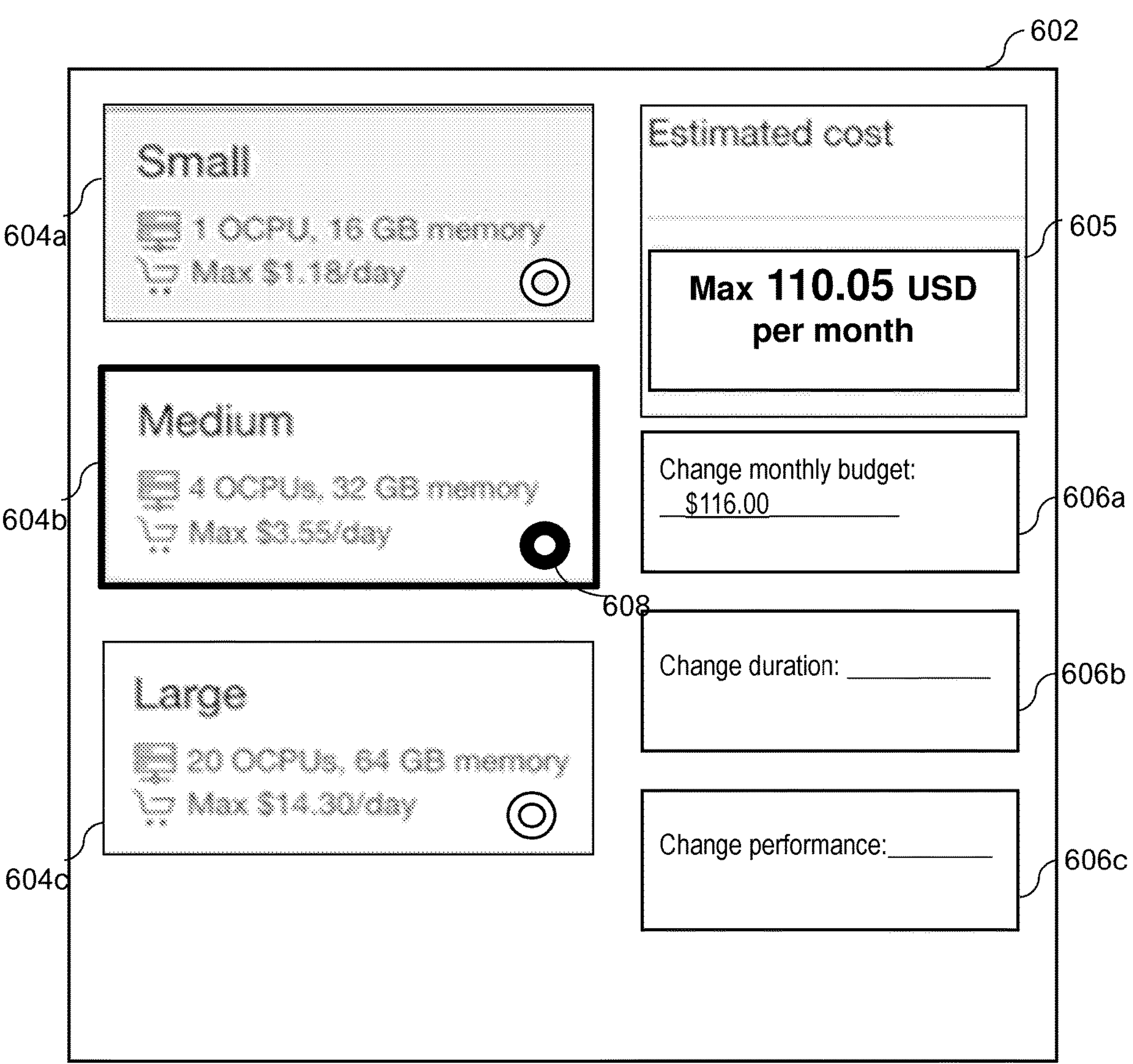
FIG. 6 illustrates an example of a graphical user interface in accordance with one or more embodiments.

FIG. 6 illustrates an example of a GUI 602 that is presenting three interface elements 604*a*, 604*b*, and 604*c* representing three different workstation configurations. The GUI 602 is also presenting three interface elements 606*a*, 660*b*, and 606*c* representing three respective single user inputs. The user has entered a changed monthly budget in interface element 606*a* of $116.00. Responsive to that input, the graphical user interface generator 112 has determined that the "medium" workstation configuration most closely meets the revised target budget. Interface element 608 indicates that the interface element 604*b*, corresponding to the "medium" workstation configuration, is now selected. The cost associated with the selected workstation configuration is displayed in the interface element 605 as $110.05 per month.

Figure 7:
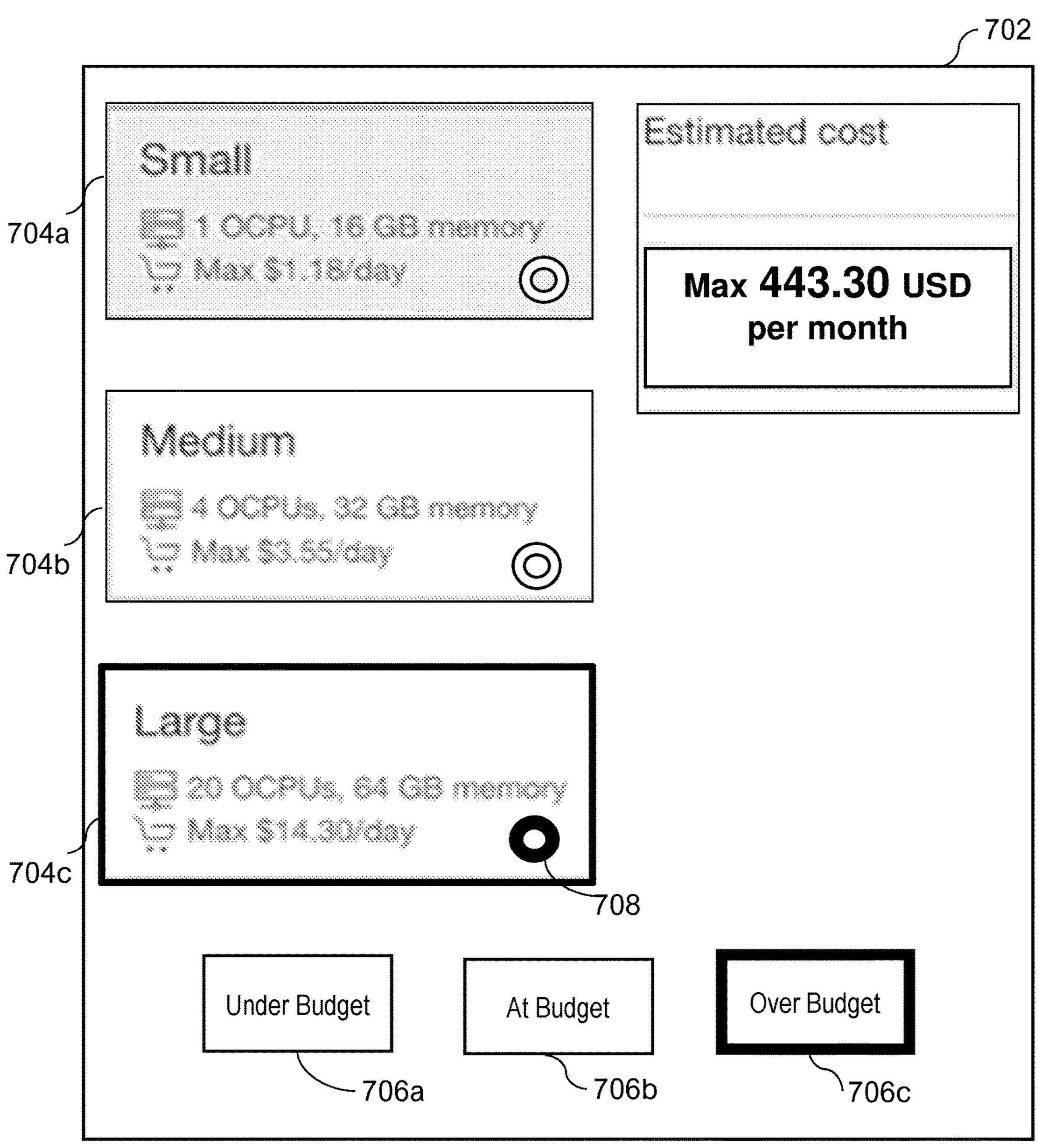
FIG. 7 illustrates an example of a graphical user interface in accordance with one or more embodiments.

FIG. 7 illustrates an example of a GUI 702 that is presenting three interface elements 704*a*, 704*b*, and 704*c* representing three different workstation configurations. The GUI 702 is also presenting three interface elements 706*a*, 706*b*, and 706*c* representing possible relationships between a user-specified target budget and the cost of a selected workstation configuration. The user has selected the interface element 704*c*, as indicated by interface element 708, representing the "large" workstation configuration. Responsive to that selection and assuming a user-specified budget of less than $443.30 per month, the graphical user interface generator 112 has determined that the cost associated with the "large" workstation configuration exceeds the user-specified budget. The graphical user interface generator 112 accordingly presents interface element 706*c* to indicate that the selection is over budget. If all three interface elements 706*a, b*, and *c* are concurrently displayed, the graphical user interface generator 112 may graphically emphasize the interface element 706 that corresponds with the determined cost-budget relationship, e.g., with a bold border, different color, different shading, or different size relative to the other interface elements 706. Alternatively, the graphical user interface generator 112 may present only the interface element 706 that corresponds with the determined cost-budget relationship.

Figure 8:
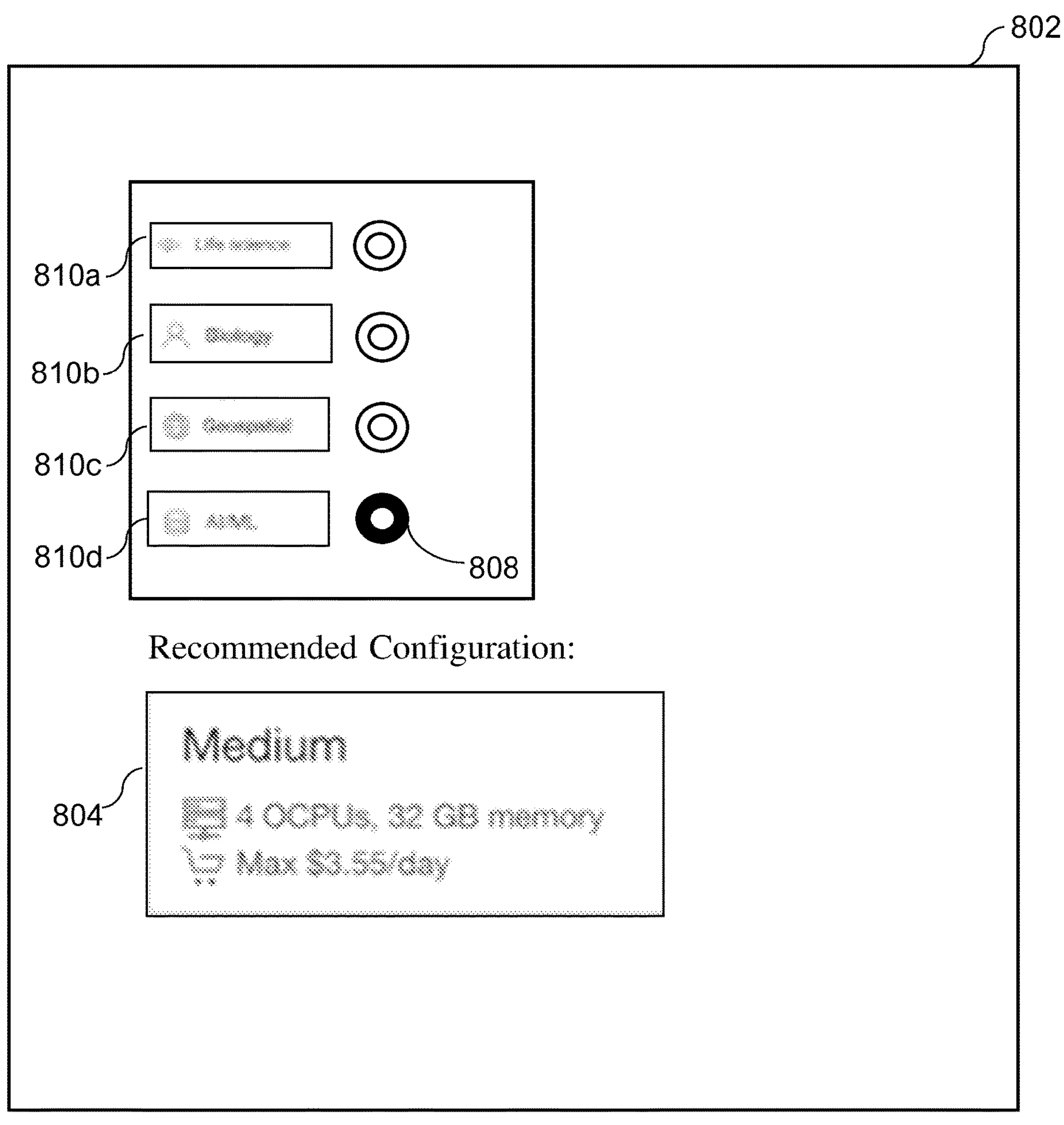
FIG. 8 illustrates an example of a graphical user interface in accordance with one or more embodiments.

FIG. 8 illustrates an example of a GUI 802 that is presenting interface elements 810*a*, 810*b*, 810*c* and 810*d* for selecting an application service domain. The user has selected the interface element 810*d* representing the application service domain of "AI/ML" (artificial intelligence/machine learning) as indicated by the interface element 808. Responsive to the selection, the recommendation engine 140 may generate a workstation configuration for the selected application service domain. In one or more embodiments, the recommendation engine 140 may use the machine learning model 144 applied to the selected application service domain and any provided user inputs 130 to generate a recommended workstation configuration. In one or more embodiments, the recommendation engine 140 may use one or more rules based on the selected application service domain and any provided user inputs 130 to generate a recommended workstation configuration. In the absence of any user inputs 130, the recommendation engine 140 may look up a workstation configuration for the selected application service domain in the cloud service workstation configurations 124. The graphical user interface generator 112 may present an interface element 804 to represent the recommended workstation configuration. In some embodiments, if the recommendation engine 140 generates more than one recommended workstation configuration, the graphical user interface generator 112 may present each of the recommended workstation configurations.

6. PRACTICAL APPLICATIONS, ADVANTAGES, AND IMPROVEMENTS

In one or more embodiments, the system 100 provides a simple way to select a cloud service workstation configuration without requiring that the selecting user have expert skills in provisioning a cloud working environment, while also respecting customer needs such as budget, timing and/or performance constraints. The system 100 provides the total expected cost of a workstation configuration prior to any creation of the workstation and prior to commitment from the user. The system 100 allows the user to modify a configuration without having to specify a requested set of particular resources. The system 100 can recommend a workstation configuration based on user inputs without requiring the user to select individual resource components for a workstation.

7. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a “cloud network.”

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider’s applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term “entity” as used herein refers to a corporation, organization, person, or other entity). The network resources may be local to and/or remote from the premises of the particular group of entities. In a public cloud, cloud resources are provisioned for multiple entities that are independent from each other (also referred to as “tenants” or “customers”). The computer network and the network resources thereof are accessed by clients corresponding to different tenants. Such a computer network may be referred to as a “multi-tenant computer network.” Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
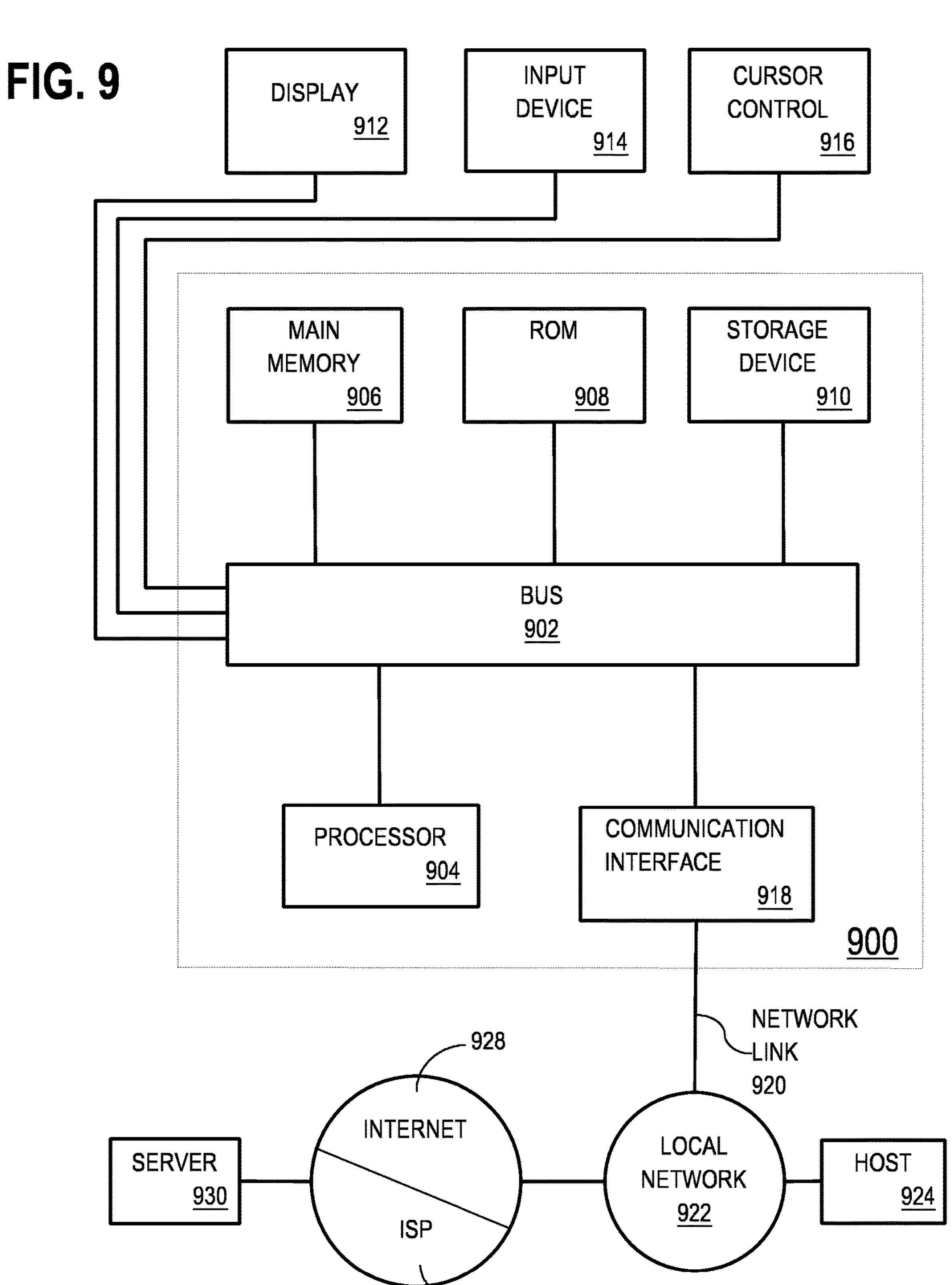
FIG. 9 shows a block diagram that illustrates a computer system in accordance with one or more embodiments.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

9. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A One or more non-transitory computer readable media comprising instructions that, when executed by one or more hardware processors, causes performance of operations comprising:

presenting a Graphical User Interface (GUI) concurrently displaying:

a first interface element presenting a first cloud service workstation configuration defining, for a first cloud service workstation, at least two of: a first set of compute resources, a first set of network resources, and a first set of storage resources for a cloud environment;

a second interface element presenting a first cost associated with the first cloud service workstation;

a third interface element presenting a second cloud service workstation configuration defining, for a second cloud service workstation, at least two of: a second set of compute resources, a second set of network resources, and a second set of storage resources for the cloud environment;

a fourth interface element presenting a second cost associated with the second cloud service workstation;

wherein the GUI includes functionality to receive a selection of any cloud service workstation configuration;

receiving user input selecting the first cloud service workstation configuration; and displaying a fifth interface element indicating the selection of the first cloud service workstation configuration.

2. The one or more non-transitory computer-readable media of claim 1, wherein the operations further comprise:

receiving a second user input selecting one or more optional components for implementing with the first cloud service workstation configuration; and updating a display of an estimated cost within the GUI in response to receiving the second user input, the estimated cost reflecting both (a) the first cloud service workstation configuration and (b) the one or more optional components selected via the second user input.

3. The one or more non-transitory computer-readable media medium of claim 1, wherein the operations further comprise:

receiving a user input selecting a third cloud service workstation configuration;

concurrently presenting the third cloud service workstation configuration and a third cost associated with the third cloud service workstation configuration, the third cloud service workstation configuration defining at least two of: a third set of compute resources, a third set of network resources, and a third set of storage resources;

receiving a single user input to modify the third cloud service workstation configuration, wherein the single user input does not specify a requested set of compute resources, a requested set of network resources, or a requested set of storage resources; and determining a fourth cloud service workstation configuration, the fourth cloud service workstation configuration defining at least two of: a fourth set of compute resources, a fourth set of network resources, and a fourth set of storage resources, wherein the third set of compute resources is different than the fourth set of compute resources, and wherein the third set of storage resources is different than the fourth set of storage resources.

4. The one or more non-transitory computer-readable media of claim 3, wherein the single user input specifies a new target budget that is different from a current target budget.

5. The one or more non-transitory computer-readable media of claim 3, wherein the single user input specifies a new desired performance level that is different from a current desired performance level.

6. The one or more non-transitory computer-readable media of claim 3, wherein the single user input specifies a new desired duration for the cloud environment that is different from a current desired duration for the cloud environment.

7. The one or more non-transitory computer-readable media of claim 1, wherein the GUI further comprises a sixth user element indicating a relationship between (a) the first cost associated with the first cloud service workstation and (b) a user-identified budget.

8. The one or more non-transitory computer-readable media of claim 1, wherein the cost associated with a cloud service workstation includes a negotiated cost for a particular user.

9. The one or more non-transitory computer-readable media of claim 1, wherein the operations further comprise:

displaying a seventh interface element representing a first application service domain and an eighth interface element representing a second application service domain;

receiving user input selecting the first application service domain;

generating a recommended workstation configuration responsive to receiving the selection of the first application service domain; and displaying a ninth interface element representing the recommended workstation configuration.

10. The one or more non-transitory computer-readable media of claim 1 wherein the operations further comprise:

obtaining sets of historical training data, each set of historical training data comprising:

a first cloud service workstation configuration defining at least two of: a first set of compute resources, a first set of network resources, and a first set of storage resources for a cloud environment;

an application service domain corresponding to an application using the first cloud service workstation; and a performance measurement corresponding to performance of the first cloud service workstation;

training a machine learning model to recommend cloud service workstation configurations based on the sets of historical training data;

receiving a user selection of a target application service domain; and applying the machine learning model to the target application service domain to select the first cloud service workstation configuration as a recommended cloud service workstation configuration;

wherein the first interface element presents the first cloud service workstation configuration as the recommended cloud service workstation configuration in the graphical user interface.

11. The one or more non-transitory computer-readable media of claim 10, the operations further comprising:

iteratively applying the machine learning model on additional sets of training data;

updating the machine learning model based on results generated by iteratively applying the machine learning model to the additional sets of training data; and applying the updated machine learning model to a second target application service domain to select the second cloud service workstation configuration as a second recommended cloud service workstation configuration;

wherein the second interface element presents the second cloud service workstation configuration as the second recommended cloud service workstation configuration in the graphical user interface.

12. The one or more non-transitory computer-readable media of claim 10, the operations further comprising:

receiving at least one of a performance measurement or feedback about the recommended workstation configuration;

applying the machine learning model on additional sets of training data comprising the received performance measurement or feedback;

updating the machine learning model based on results generated by applying the machine learning model to the additional sets of training data;

applying the updated machine learning model to a third target application service domain to select a third recommended cloud service workstation configuration; and presenting the third recommended cloud service workstation configuration as a sixth interface element in the graphical user interface.

13. A system comprising:

one or more hardware processors;

one or more non-transitory computer-readable media; and program instructions stored on the one or more non-transitory computer-readable media that, when executed by the one or more hardware processors, cause the system to perform operations comprising:

presenting a Graphical User Interface (GUI) concurrently displaying:

a first interface element presenting a first cloud service workstation configuration defining, for a first cloud service workstation, at least two of: a first set of compute resources, a first set of network resources, and a first set of storage resources for a cloud environment;

a second interface element presenting a first cost associated with the first cloud service workstation;

a third interface element presenting a second cloud service workstation configuration defining, for a second cloud service workstation, at least two of: a second set of compute resources, a second set of network resources, and a second set of storage resources for the cloud environment; and a fourth interface element presenting a second cost associated with the second cloud service workstation;

wherein the GUI includes functionality to receive a selection of any cloud service workstation configuration;

receiving user input selecting the first cloud service workstation configuration; and displaying a fifth interface element indicating the selection of the first cloud service workstation configuration.

14. The system of claim 13, wherein memory further comprises instructions that, when executed by the one or more processors, cause the system to perform:

receiving a second user input selecting one or more optional components for implementing with the first cloud service workstation configuration; and updating a display of an estimated cost within the GUI in response to receiving the second user input, the estimated cost reflecting both (a) the first cloud service workstation configuration and (b) the one or more optional components selected via the second user input.

15. The system of claim 13, wherein memory further comprises instructions that, when executed by the one or more processors, cause the system to perform:

receiving a user input selecting a third cloud service workstation configuration;

concurrently presenting the third cloud service workstation configuration and a third cost associated with the third cloud service workstation configuration, the third cloud service workstation configuration defining at least two of: a third set of compute resources, a third set of network resources, and a third set of storage resources;

receiving a single user input to modify the third cloud service workstation configuration, wherein the single user input does not specify a requested set of compute resources, a requested set of network resources, or a requested set of storage resources; and determining a fourth cloud service workstation configuration, the fourth cloud service workstation configuration defining at least two of: a fourth set of compute resources, a fourth set of network resources, and a fourth set of storage resources, wherein the third set of compute resources is different than the fourth set of compute resources, and wherein the third set of storage resources is different than the fourth set of storage resources.

16. The system of claim 15, wherein the single user input specifies a new target budget that is different from a current target budget.

17. The system of claim 15, wherein the single user input specifies a new desired performance level that is different from a current desired performance level.

18. The system of claim 15, wherein the single user input specifies a new desired duration for the cloud environment that is different from a current desired duration for the cloud environment.

19. The system of claim 13, wherein the GUI further comprises a sixth user element indicating a relationship between (a) the first cost associated with the first cloud service workstation and (b) a user-identified budget.

20. The system of claim 13, wherein memory further comprises instructions that, when executed by the one or more processors, cause the system to perform:

displaying a seventh interface element representing a first application service domain and an eighth interface element representing a second application service domain;

receiving user input selecting the first application service domain;

generating a recommended workstation configuration responsive to receiving the selection of the first application service domain; and displaying a ninth interface element representing the recommended workstation configuration.

21. A method comprising:

presenting a Graphical User Interface (GUI) concurrently displaying:

a first interface element presenting a first cloud service workstation configuration defining, for a first cloud service workstation, at least two of: a first set of compute resources, a first set of network resources, and a first set of storage resources for a cloud environment;

a second interface element presenting a first cost associated with the first cloud service workstation;

a third interface element presenting a second cloud service workstation configuration defining, for a second cloud service workstation, at least two of: a second set of compute resources, a second set of network resources, and a second set of storage resources for the cloud environment; and a fourth interface element presenting a second cost associated with the second cloud service workstation;

wherein the GUI includes functionality to receive a selection of any cloud service workstation configuration;

receiving user input selecting the first cloud service workstation configuration; and displaying a fifth interface element indicating the selection of the first cloud service workstation configuration;

wherein the method is performed by at least one device including a hardware processor.

* * * * *